(12) United States Patent
Miyawaki

(10) Patent No.: US 7,620,601 B2
(45) Date of Patent: Nov. 17, 2009

(54) INTERNET CHARGING SYSTEM

(75) Inventor: Hiroshi Miyawaki, Saijo (JP)

(73) Assignee: Panasonic Corporation, Osaka (JP)

( * ) Notice: Subject to any disclaimer, the term of this patent is extended or adjusted under 35 U.S.C. 154(b) by 1365 days.

(21) Appl. No.: 10/031,138

(22) PCT Filed: May 16, 2001

(86) PCT No.: PCT/JP01/04077

§ 371 (c)(1),
(2), (4) Date: May 2, 2002

(87) PCT Pub. No.: WO01/88791

PCT Pub. Date: Nov. 22, 2001

(65) Prior Publication Data

US 2002/0152121 A1    Oct. 17, 2002

(30) Foreign Application Priority Data

May 16, 2000    (JP) .............................. 2000-142666

(51) Int. Cl.
*G06Q 30/00* (2006.01)
(52) U.S. Cl. ........................................................ 705/40
(58) Field of Classification Search .................. 705/14, 705/49, 1, 412, 30, 34, 40, 44, 51–54, 59, 705/75–78; 726/1–7, 21, 26–34; 725/1, 725/104; 379/114, 121, 126–127; 455/406–409
See application file for complete search history.

(56) References Cited

U.S. PATENT DOCUMENTS

| | | | | |
|---|---|---|---|---|
| 5,913,040 A | * | 6/1999 | Rakavy et al. ............... | 709/232 |
| 6,009,410 A | * | 12/1999 | LeMole et al. ............... | 705/14 |
| 6,240,091 B1 | * | 5/2001 | Ginzboorg et al. .......... | 370/401 |
| 6,487,560 B1 | * | 11/2002 | LaRue et al. ................ | 707/203 |
| 6,678,866 B1 | * | 1/2004 | Sugimoto et al. ........... | 715/517 |
| 6,748,439 B1 | * | 6/2004 | Monachello et al. ........ | 709/229 |
| 7,136,853 B1 | * | 11/2006 | Kohda et al. ................. | 707/6 |
| 2001/0027449 A1 | * | 10/2001 | Wright ....................... | 705/412 |

(Continued)

FOREIGN PATENT DOCUMENTS

EP    0 955 589 A1    11/1999

(Continued)

OTHER PUBLICATIONS

"Build Your Web Site", Home Office Computing, v15, n6, p. 61(21), Jun. 1997.*

(Continued)

*Primary Examiner*—Mary Cheung
(74) *Attorney, Agent, or Firm*—Marjama Muldoon Blasiak & Sullivan, LLP

(57) ABSTRACT

A charging system which enables a customer to select an access method from plural kinds of access service including access service with advertisements, when the customer uses the Internet. Internet access information, and information on a method for displaying information for charging and a charging method associated with Internet access are transmitted to an information terminal (101) of the customer, from a terminal server (105) to which the information terminal (101) is connected through modems (102), (104) and a public network (103). The customer selects desired information from the transmitted information.

25 Claims, 6 Drawing Sheets

U.S. PATENT DOCUMENTS

2003/0069788 A1 * 4/2003 Han .......................... 705/14

FOREIGN PATENT DOCUMENTS

| JP | 2939723 | 1/1998 |
| JP | 10190737 A | 7/1998 |
| JP | 10285308 A | 10/1998 |
| JP | 11003317 A | 1/1999 |
| WO | 97/32258 | 9/1997 |
| WO | 98/04088 | 1/1998 |

OTHER PUBLICATIONS

U.S. Appl. No. 60/177,475, filed Jan. 21, 2000, Carl Wright.

* cited by examiner

INTERNET CHARGING SYSTEM

FIELD OF INVENTION

The present invention relates to a charging system which imposes charges for Internet access services and, more particularly, to an Internet charging system which enables customers to select a method for receiving Internet access services, when plural Internet providers provide the Internet access services to the customers based on plural charging methods which are respectively set on their own terms.

BACKGROUND OF THE INVENTION

When an individual who wants to use the Internet connects an information terminal to the Internet, the connection is made through an Internet access service provider (hereinafter, also referred to simply as a "provider") in most cases. When the Internet services started being prevalent, the number of providers that is accessible from the existence region of the information terminal possessed by an individual Internet user was restricted, while recently it becomes possible to access many providers from the same region, thereby diversifying choices. Meanwhile, chances of using the Internet services are increasing with the prevalence of the Internet.

However, in most cases, the individual who wants to use the Internet services utilizes general telephone subscription lines to connect the information terminal to the Internet. Therefore, when using the Internet, the Internet user is required to pay an access fee charged by the provider and a usage charge for the general telephone subscription line. When these are simply added together, a high usage charge is required.

Then, to reduce the usage charge for Internet, for example a provider provides service which varies a charging fee that is the basis of the access fee charged by the provider, according to an accumulated access time when a customer uses the Internet. Another provider provides service which varies the charging fee according to a time zone in which the customer uses the Internet. In addition, another provider provides service which makes the Internet access service usage charge free by compulsorily showing advertisements to the customers. There is also a case where one provider provides these plural kinds of service at the same time.

However, as a consequence that plural providers start to provide services according to the plural charging methods which are set respectively on their own terms, the Internet users have trouble in constantly checking and weighing information on charging systems which are provided by many providers, to utilize the most inexpensive or the most suitable access service for them.

Then, in order to cope with such diversification of usage charges and provision methods of Internet access service, for example some persons privately open web sites on which a comparison table of information on charging systems, Internet access methods and the like, provided by many providers is made and the comparison table is provided occasionally to the Internet users. Further, as disclosed in Japanese Patent No. 2939723, it is becoming possible to construct a system which enables free selection of providers, kinds of access services or the like, by adopting a charging system which makes a charging server and an authentication server work together.

However, it is hard for the Internet users to manage whole information on charging systems of many providers in real time by themselves only with the above-described charging systems or comparison of information on Internet access methods, charging methods or the like, provided on the privately-opened Web sites.

That is, the individual Internet users (customers) cannot change the Internet access service occasionally according to their usage.

Further, when a provider starts new Internet access service, the customers who have been informed of the start of the service cannot utilize the new Internet access service unless they change various settings for utilizing the Internet access service themselves, and the change of the Internet access service cannot be done in a short time.

Further, on the provider side, when customer utilization concentrates on specific Internet access service, a provision method of the Internet access service cannot be changed according to a utilization state of the network and thus the network cannot be utilized effectively. Further, since an advertisement distribution method and a charging method associated with the Internet access are somewhat fixed, the advertisement distribution method and the charging method cannot be changed according to the customers needs.

The present invention is made to solve the above-mentioned problems and has for its object to provide an Internet charging system in which information on the Internet charging system is collectively managed by a charging database, whereby a customer can select desired information from information on an Internet access method, a method for displaying information for charging and a charging method associated with the Internet access, and on the terminal server side, a provision method of Internet access service, an advertisement distribution method and a charging method associated with the Internet access can be changed according to a state of Internet usage by the customer and the result of the customer selection.

SUMMARY OF THE INVENTION

To solve the above-described problems and according to one preferred aspect of the present invention, there is provided an Internet charging system in a system having an information terminal and a terminal server that provides Internet access service employing a public network to the information terminal, comprising: on the terminal server side, a charging server for sequentially calculating an Internet usage fee which occurs according to Internet usage by an Internet user through the information terminal; a charging database having the charging table required for calculating the Internet usage fee; and a customer database having a customer table which includes information on a customer as the Internet user through the information terminal, in which on the terminal server side, the charging table which includes information on an Internet access method, a method for displaying information for the charging, and a charging method associated with Internet access is periodically transmitted to the information terminal, and on the information terminal side, the customer selects desired information from the information in the transmitted charging table. Therefore, the information in the charging table can be constantly updated, and the customer can select desired information from the information on the Internet access method, the method for displaying information for the charging, and the charging method associated with Internet access, in the transmitted charging table.

According to another preferred aspect of the present invention, there is provided an Internet charging system in a system having an information terminal and a terminal server that provides Internet access service employing a public network to the information terminal, comprising: on the terminal server side, a charging server for sequentially calculating an Internet usage fee which occurs according to Internet usage by an Internet user through the information terminal; a charging database having a charging table required for calculating the Internet usage fee; a customer database having a customer table which includes information on a customer as the Internet user through the information terminal; an advertisement data controller for controlling an size and a display time of an advertisement which is sent to the terminal server; an advertisement content server for retaining contents of the advertisement; a data traffic monitor server for monitoring data traffic of the Internet; and a usage state monitor server for monitoring a state of Internet usage by the customer, in which on the terminal server side, the charging table which includes information on an Internet access method, a method for displaying information for the charging, and a charging method associated with Internet access is periodically transmitted to the information terminal, on the information terminal side, the customer selects desired information from the information in the transmitted charging table, and on the terminal server side, an Internet access service providing method, an advertisement distribution method, and the charging method associated with Internet access are changed according to the state of Internet usage by the customer and the result of the selection by the customer of the desired information in the charging table. Therefore, a provider can change the Internet access service providing method, the advertisement distribution method, and the charging method associated with Internet access, according to the state of Internet usage by the customer and the result of the customer selection of a charging method.

According to yet another preferred aspect of the present invention, the Internet charging system as previously defined comprises: in the information terminal, an access program for accessing the Internet; a usage state monitor program for monitoring the state of Internet usage by the customer; an information terminal charging database having an information terminal charging table which includes information required for calculating the Internet usage fee; and an access setting database having an access table which includes information on plural providers such as phone numbers, ID numbers, passwords, thereby automatically changing a provider. Therefore, it is possible to change a provider automatically on the side of the information terminal possessed by the customer, when the customer desires change of the provider.

According to yet another preferred aspect of the present invention, in the defined Internet charging system, the charging table has line usage fee information concerning a usage fee of the public network. Therefore, it is possible to select the line usage fee information.

According to still another preferred aspect of the present invention, in the Internet charging system as defined, the charging table has advertisement size information concerning a size of the advertisement displayed on the information terminal. Therefore, it is possible to select the advertisement size information.

According to preferably, the charging system has advertisement number information concerning the number of advertisements displayed on the information terminal. Therefore, it is possible to select the advertisement number information.

The charging table can also include advertisement display time information concerning a display time of the advertisement displayed on the information terminal. Therefore, it is possible to select the advertisement display time information.

The charging table can further include usage time-zone information concerning a time zone in which the client uses the Internet. Therefore, it is possible to select the usage time-zone information.

The charging table preferably has information on accumulated access time that is an accumulation of time for which the customer uses the Internet. Therefore, it is possible to select the accumulated access time information.

The charging table can also have data packet amount information concerning an amount of data packets utilized in the Internet. Therefore, it is possible to select the data packet amount information.

The charging table can also have communication traffic state information concerning a communication traffic state in the public network. Therefore, it is possible to select the communication traffic state information.

According to claim 12 of the present invention, in the Internet charging system as defined in any of claims 1 to 11, the charging table has electronic commerce deal amount/frequency information, which concerns a deal amount when the customer performs electronic commerce employing the Internet, and a frequency of performing the electronic commerce. Therefore, it is possible to select the electronic commerce deal amount/frequency information.

As described above, according to the Internet charging system as defined by the present invention, the information in the charging table on the Internet access method, the method for displaying information for the charging, and the charging method associated with Internet access is constantly updated, and the customer selects desired information from the information in the charging table when connecting the information terminal to the Internet. That is, it is possible to realize an Internet charging system which meets the customer request when the customer uses the Internet.

It is also possible to realize an Internet charging system which allows a provider to change the Internet access service providing method, the advertisement distribution method, and the charging method associated with Internet access according to the state of Internet usage by the customer and the result of the customer selection of the desired information in the charging table.

It is further possible to realize an Internet charging system which enables change of a provider on the side of the information terminal possessed by the customer as an Internet user, when the customer desires change of the provider.

According to the Internet charging system as defined in any of claims 4 to 12 of the present invention, information such as the line usage fee information, the advertisement size information, the advertisement number information, the advertisement display time information, the usage time-zone information, the accumulated access time information, a data packet amount information, a communication traffic information, and electronic commerce deal amount/frequency information is included in the charging table. Therefore, there can be realized an Internet charging system which enables the customer to perform selection, combining the conditions such as the line usage fee, the advertisement size, the number of advertisements, the advertisement display time, the usage time-zone, the accumulated access time, the amount of data packets, the communication traffic, and the deal amount and frequency of electronic commerce, with the charging method.

The present invention can provides an Internet charging system by which when plural Internet access providers provide Internet access services to a customer based on plural charging methods which are set respectively on their own terms, the customer selects a providing method of the Internet

DETAILED DESCRIPTION

Hereinafter, embodiments according to the present invention will be described with reference to the drawings. The embodiments described here are given only as examples and the present invention is not restricted to these embodiments.

Embodiment 1

Hereinafter, an Internet charging system according to a first embodiment of the present invention will be described with reference to FIGS. 1 and 2.

Figure 1:
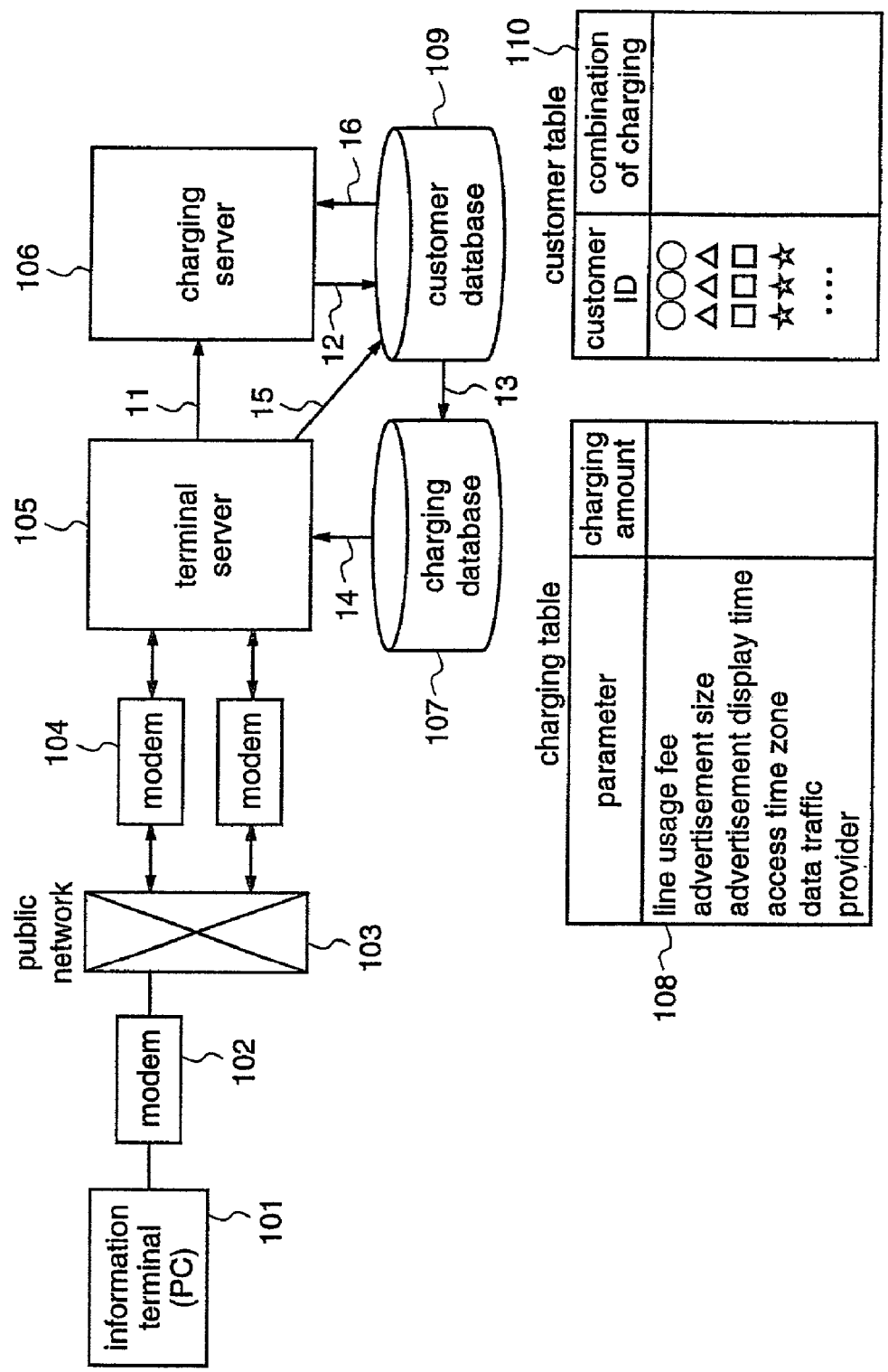
FIG. 1 is a block diagram schematically illustrating an Internet charging system according to a first embodiment.

FIG. 1 is an example of an Internet charging system A according to the present invention, while the structure of the Internet charging system A shown here is not restricted thereto. Further, a personal computer (PC) or the like, for example, is employed as an information terminal 101.

In FIG. 1, the Internet charging system A is an Internet charging system in a system which includes an information terminal 101 to which a modem 102 is connected, a public network 103 connected to the information terminal 101 through the modem 102 and a terminal server 105 which provides Internet access service through a modem 104 to the information terminal 101, the public network 103 and the modem 102, in which Internet charging system, on the side of the terminal server 105, there are provided a charging server 106 for sequentially calculating an Internet usage fee which occurs according to Internet usage by an Internet user through the information terminal 101, a charging database 107 having a charging table 108 that is necessary for the calculation of the Internet usage fee, and a customer database 109 having a customer table 110 that has information on a customer who is a user of the Internet through the information terminal 101, and on the terminal server 105 side, the charging table 108 which includes information on an Internet access method, a method for displaying information for charging and a charging method associated with the Internet access is periodically transmitted to the information terminal 101, while on the information terminal 101 side the customer selects desired information from the information in the transmitted charging table 108.

The customer who intends to use the Internet connects their own information terminal 101 to the Internet charging system A as shown in FIG. 1, while the connection method is as follows. That is, the information terminal 101 is connected to the public network 103, such as a phone line and a cable, through the modem 102 and thereafter connected to the terminal server 105 through the modem 104 which is connected to each port of the terminal server 105, thereby connecting to the Internet charging system A.

A specific operation of the so-constructed Internet charging system A will be described with reference to FIG. 2.

Figure 2:
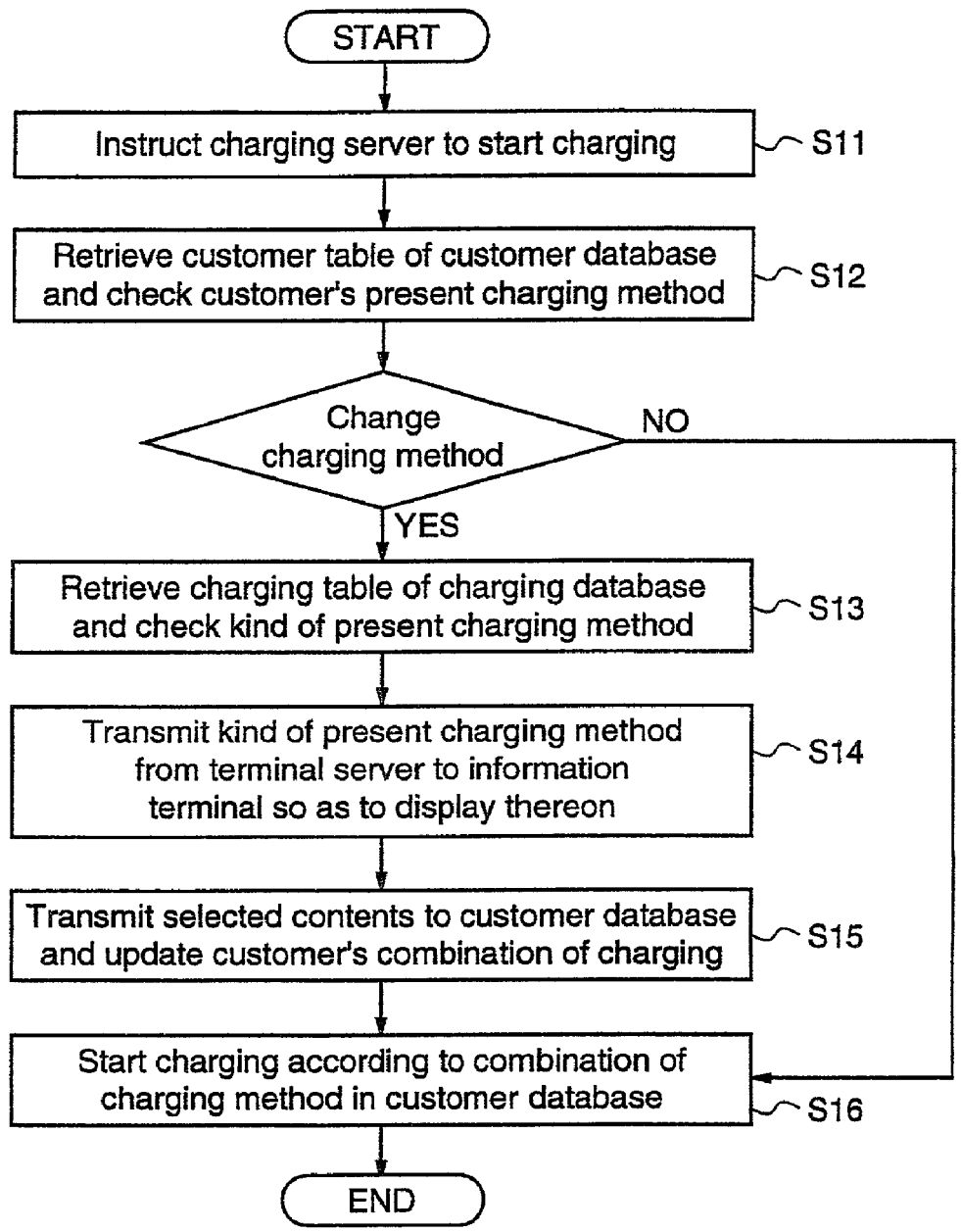
FIG. 2 is a flowchart for explaining an operation of the Internet charging system according to the first embodiment.

FIG. 2 is a flowchart showing process steps of the Internet charging system A according to the first embodiment.

The information terminal 101 requesting accesses to the Internet is authenticated by means of a customer ID and a password or the like, and then its connection is authorized. After the authorization of the connection, in S11, the terminal server 105 instructs the charging server 106 to start charging (See FIG. 1 (11)).

In S12, the charging server 106 accesses the customer database 109, retrieves the customer table 110, and checks the present charging method of the customer (See FIG. 1 (12)).

In a case where the customer desires to change the charging method, in S13, the customer database 109 accesses the charging database 107 and retrieves what kinds of charging methods are on the present charging table 108 (See FIG. 1 (13)).

In S14, the data of the retrieved charging methods are sent to the terminal server 105 from the charging database 107, and the terminal server 105 makes the information terminal 101 display a charging menu (See FIG. 1 (14)).

In S15, the customer selects a charging method on the information terminal 101, and thereafter the data are sent from the terminal server 105 to the customer database 109 and the customer table 110 is updated (See FIG. 1 (15)). Then, in S16, the updated charging method is returned to the charging server, and charging is started on the basis of the charging method (See FIG. 1 (16)).

In a case where the customer does not change the charging method, the operation proceeds directly to S16 after the process of S12.

Further, the charging methods are given by the access provider as various kinds of service, while as the charging methods, selection is made from information such as line usage fee information concerning the usage fee for the public network ($\Delta$ yen/minute), advertisement size information concerning the size of an advertisement displayed on the information terminal 101 ($\Delta \times \Delta$ mm or smaller), advertisement number information concerning the number of advertisements displayed on the information terminal 101 ($\Delta$ pieces or less), advertisement display time information concerning a display time of an advertisement displayed on the information terminal 101 (within $\Delta$ minutes/day), use time-zone information concerning a time zone in which the customer uses the Internet (from $\Delta$ p.m. to $\Delta$ a.m.), accumulated access time information concerning an accumulated access time which is an accumulation of time for which the customer uses the Internet (within $\Delta$ hours/month), data-packet amount information concerning the amount of data packets at the Internet use (within $\Delta$ KB/day), communication traffic information concerning communication traffic in the public network ($\Delta$ people/simultaneous access), and information on the deal amount when the customer performs electronic commerce employing the Internet and the frequency of performing the electronic commerce ($\Delta$ yen/month or more), and the selection is registered in the charging table 108. Of course, information other than those described above may be registered in the charging table 108. The charging table 108 in the charging database 107 is constantly updated.

As described above, according to the Internet charging system A of the first embodiment, information on the Internet access method, the method for displaying information for charging and the charging method associated with the Internet access in the charging table 108 is constantly updated, and the customer can select desired information from the information in the charging table 108 when connecting the information terminal 101 to the Internet, resulting in quite a suited Internet charging system.

Embodiment 2

Hereinafter, an Internet charging system B according to a second embodiment of the present invention will be described with reference to FIGS. 3 and 4.

Figure 3:
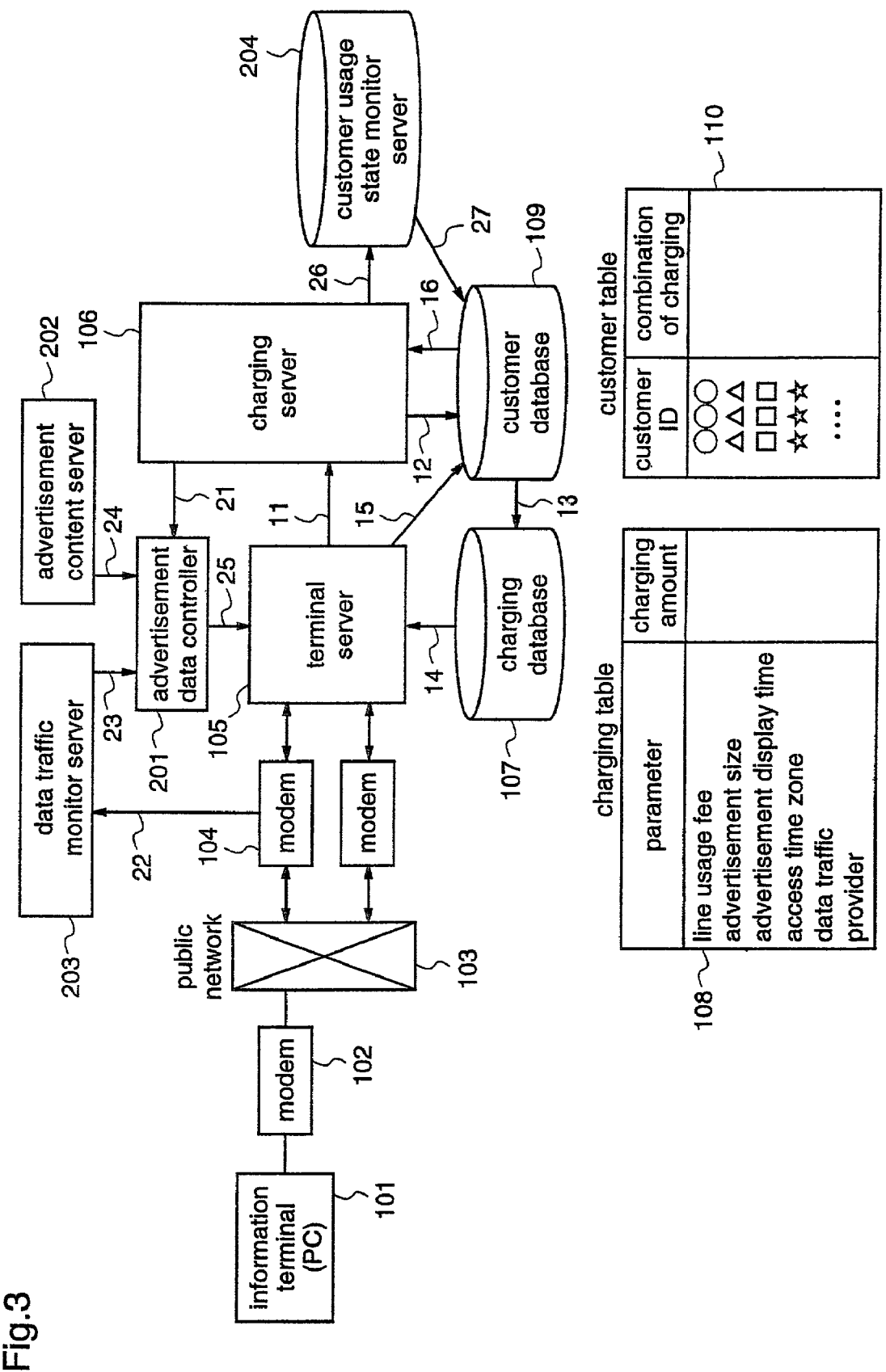
FIG. 3 is a block diagram schematically illustrating an Internet charging system according to a second embodiment.

FIG. 3 shows an example of the Internet charging system B according to the second embodiment, while the structure of the Internet charging system B shown here is not restricted thereto. Further, a personal computer (PC) or the like, for example, is employed as an information terminal 101. Here, the same component parts as those in the Internet charging system A shown in FIG. 1 are denoted by the same reference numerals, and their descriptions will be omitted.

In FIG. 3, the Internet charging system B is an Internet charging system in a system which includes an information terminal 101 and a terminal server 105 that provides Internet access service employing a public network 103 to the information terminal 101, in which Internet charging system, on the terminal server 105 side, there are provided a charging server 106, a charging database 107, a customer database 109, an advertisement data controller 201 which is connected to the terminal server 105 and the charging server 106 and controls the size and the display time of an advertisement that are sent to the terminal server 105, an advertisement content server 202 which is connected to the advertisement data controller 201 and keeps contents of the advertisement distributed to a customer, a data traffic monitor server 203 which monitors data traffic of the Internet and is connected to the advertisement data controller 201 and a modem 104, and a customer usage state monitor server 204 which is connected to the charging server 106 and the customer database 109 and monitors a state of Internet usage by the customer, and on the terminal server 105 side, the charging table 108 which includes information on an Internet access method, a method for displaying information for charging and a charging method associated with the Internet access is periodically transmitted to the information terminal 101, while on the information terminal 101 side the customer selects desired information from the information in the transmitted charging table 108, and a provision method of Internet access service, an advertisement distribution method and the charging method associated with the Internet access are changed according to the state of Internet usage by the customer and the result of selection of the desired information in the charging table 108 by the customer.

A specific operation of the so-constructed Internet charging system B will be described with reference to FIG. 4.

Figure 4:
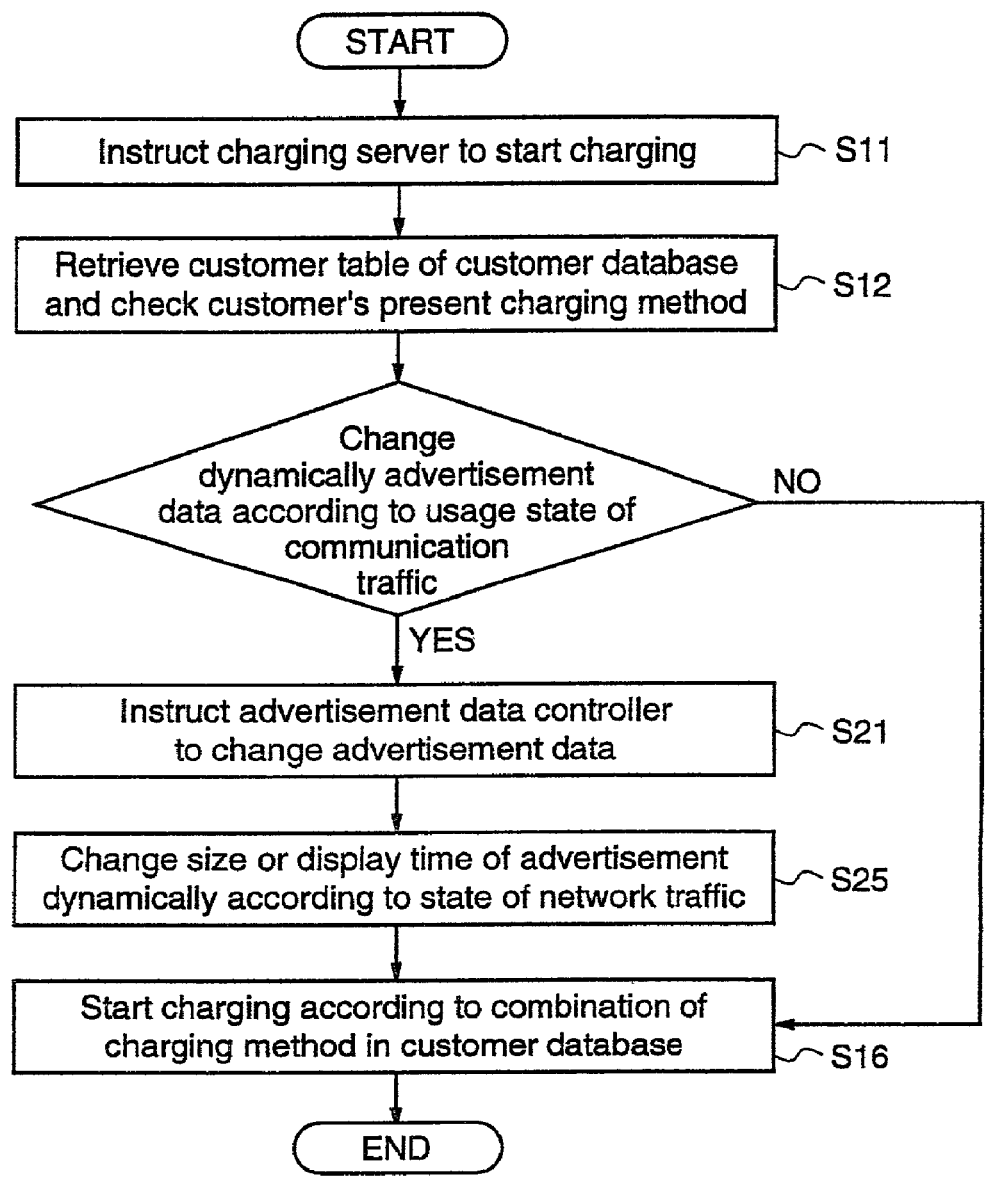
FIG. 4 is a flowchart for explaining an operation of the Internet charging system according to the second embodiment.

FIG. 4 is a flowchart showing process steps of the Internet charging system B according to the second embodiment.

The information terminal 101 which requests an access to the Internet is authenticated by means of a customer ID and a password and the like, and then its connection is authorized. After the authorization of the connection, in S11, the terminal server 105 instructs the charging server 106 to start charging (See FIG. 3 (11)).

In S12, the charging server 106 accesses the customer database 109, retrieves the customer table 110, and checks the present charging method of the customer (See FIG. 3 (12)).

In a case where the present Internet charging method of the customer is changed according to the usage state such as communication traffic and the data packet amount, in S21, the charging server 106 instructs change of advertisement data inserted in the advertisement data controller 201 (See FIG. 3 (21)).

Here, the amount of data passing through the modem 104 and the state of the communication traffic are sequentially monitored by the data traffic monitor server 203 (See FIG. 3 (22)), and those conditions are periodically sent to the advertisement data controller 201 (See FIG. 3 (23)). In the advertisement data controller 201, advertisement information in the advertisement content server 202 is extracted (See FIG. 3 (24)), and in S25 the advertisement size or the advertisement display time is changed according to the state of the network traffic (See FIG. 3 (25)).

The operation in S25 will be described further. For example, when the information sent from the terminal server 105 is augmented and the traffic on the modem 104 continues to exceed the upper limit of transmission capacity, the advertisement data controller 201 reduces the advertisement size or the number of advertisements, thereby communicating data other than advertisement by priority. On the other hand, when the information sent from the terminal server 105 is decreased and the traffic on the modem 104 continues to be under the upper limit of the transmission capacity, the advertisement data controller 201 increases the advertisement size or the number of advertisements, thereby sending clearer advertisement data. Further, in the case of changing the present charging method according to usage of the customer, the charging server 106 instructs the customer usage state monitor server 204 to change the charging method (See FIG. 3 (26)).

The customer usage state monitor server 204 monitors the usage state of the customer, sends information on the method for charging the customer to the customer database 109, and sequentially updates the customer table 110 (See FIG. 3 (27)).

Then, in S16, the updated charging method is returned to the charging server, and charging is started on the basis of the charging method (See FIG. 3 (16)). In a case where the Internet access charging method selected by the customer does not allow the change of advertisement data according to the usage state of the communication traffic or the like, the operation proceeds directly to S16.

As described above, according to the Internet charging system B of the second embodiment, on the terminal server side, the Internet access service providing method, the advertisement distribution method and the charging method associated with the Internet access can be changed according to the state of Internet usage by the customer and the result of selection of the information included in the charging table by the customer, resulting in quite a suited Internet charging system.

Further, a variety of information included in the charging table 108 of the second embodiment are the same as those described in the first embodiment, and their descriptions are omitted here.

Embodiment 3

Hereinafter, an Internet charging system according to a third embodiment of the present invention will be described with reference to FIGS. 5 and 6.

An Internet charging system C according to the third embodiment has an information terminal 101 utilized by a customer, which is provided with an access program 301 for accessing the Internet, a usage state monitor program 302 for monitoring a state of Internet usage by the customer, an information terminal charging database 303 provided with an information terminal charging table 304 that is necessary for calculating an Internet usage fee, and an access setting database 305 provided with an access table 306 including information on plural providers such as access points, phone numbers, ID numbers, passwords, thereby automatically changing providers. Here, as shown in FIG. 5, a terminal server 105 connected through a public network 103 is the same as that of the Internet charging system A described in the first embodiment or that of the Internet charging system B described in the second embodiment, and its detailed description will be omitted here.

A specific operation of the so-constructed Internet charging C will be described with reference to FIG. 6.

Figure 6:
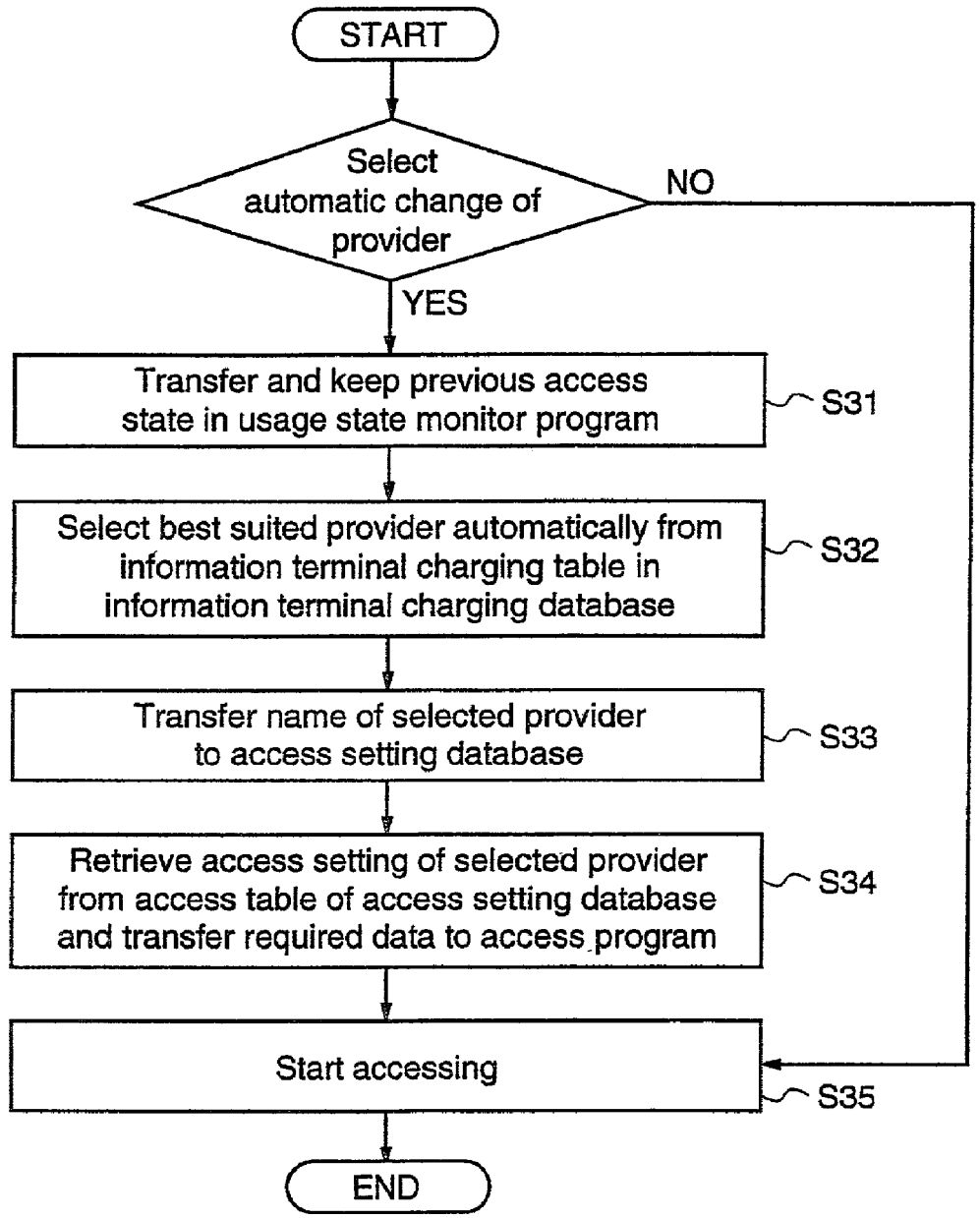
FIG. 6 is a flowchart for explaining an operation of the Internet charging system according to the third embodiment.

FIG. 6 is a flowchart showing process steps of the Internet charging system C.

First, when starting accessing the Internet, the customer selects whether to change a provider or not.

Figure 5:
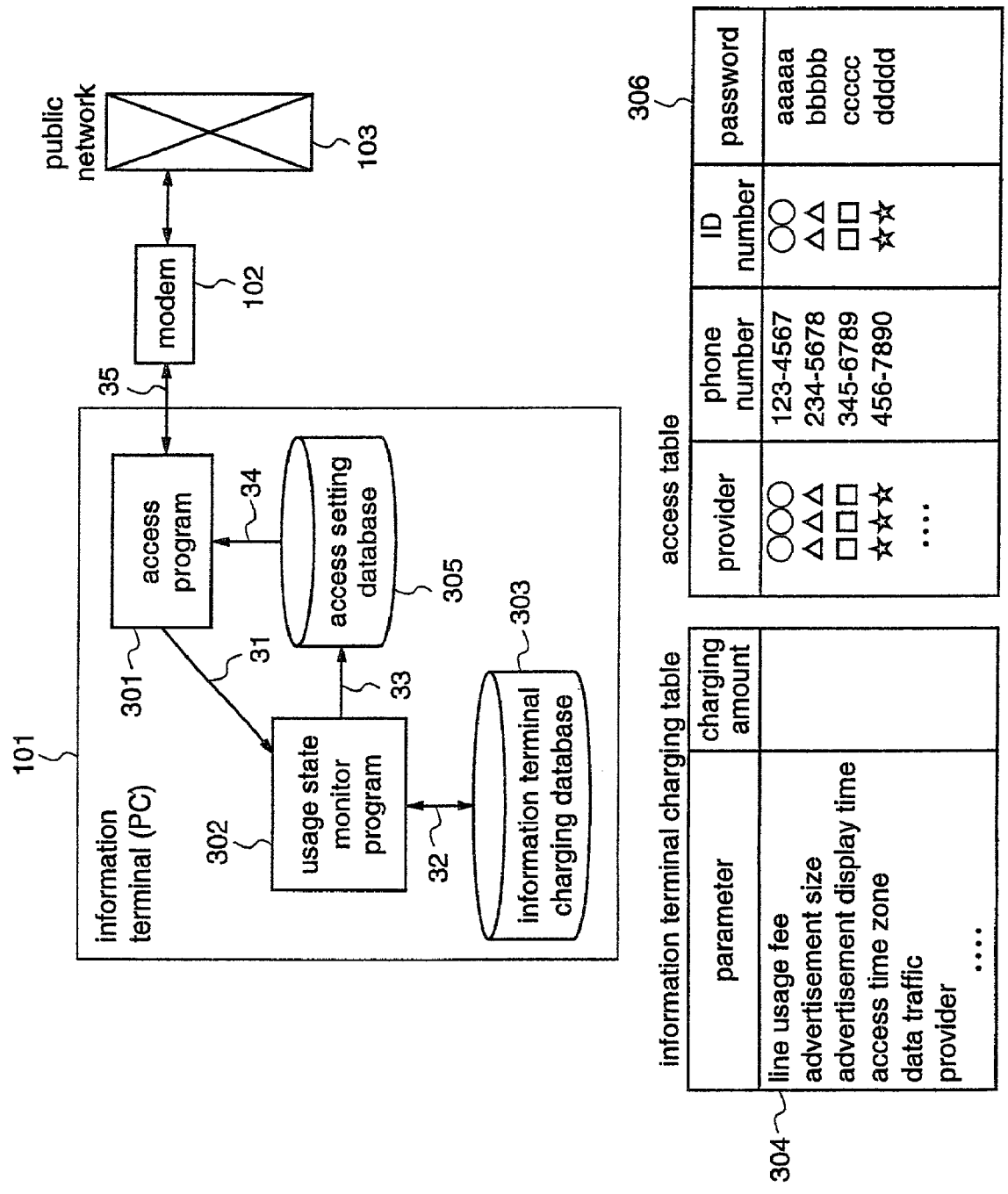
FIG. 5 is a block diagram schematically illustrating an Internet charging system according to a third embodiment.

When the customer selects the change of the provider, in S31, the information terminal 101 which requests the access to the Internet transfers previous Internet access state to the usage state monitor program 302 and keeps the state in the program (See FIG. 5 (31)).

Next, in S32, during the ongoing Internet access operation, on the basis of the access state transferred in S31, a provider which provides a charging method desired by the customer is automatically selected from the information terminal charging table 304 in the information terminal charging database 303 (See FIG. 5 (32)), and in S33 the name of the provider is transferred to the access setting database 305 (See FIG. 5 (33)).

Since the access table 306 in which phone numbers, ID numbers, passwords and the like for respective providers are registered is kept in the access setting database 305, data required for accessing the specified provider are transferred from the access table 306 to the access program 301 in S34 (See FIG. 5 (34)), and the access is started in S35 (See FIG. 5 (35)).

As described above, according to the Internet charging system C of the third embodiment, in a case where the customer desires change of the provider, the provider can be automatically changed on the side of the information terminal possessed by the customer as an Internet user, resulting in quite a suited Internet charging system.

According to the so-operated Internet charging system C, in a case for example where a customer who has utilized a provider with a low effective speed of contents data due to large advertisement size or number of advertisements but with low access fee desires to change to a provider with smaller advertisement size and number of advertisements even with a higher access fee with the increase of contents data to be downloaded, another access point fulfilling the conditions on the access setting database 305 is connected when the customer selects high speed setting of transfer rate on the access program 301.

APPLICABILITY IN INDUSTRY

The present invention can provides an Internet charging system by which when plural Internet access providers provide Internet access services to a customer based on plural charging methods which are set respectively on their own terms, the customer selects a providing method of the Internet access service. The present invention can be utilized when an individual who intends to use the Internet accesses the Internet for information request.

I claim:

1. An Internet charging system in a system having an information terminal and a terminal server that provides Internet access service employing a public network to the information terminal, comprising on the terminal server side:
  a charging server for sequentially calculating an Internet usage fee which occurs according to Internet usage by an Internet user through the information terminal;
  a charging database having a charging table required for calculating the Internet usage fee; and
  a customer database having a customer table which includes information on a customer as the Internet user through the information terminal;
  wherein the charging table which includes information on a charging method associated with Internet access is periodically transmitted to the information terminal;
  wherein the information terminal is adapted to allow the customer to select a desired charging method information from the transmitted charging table, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network; and
  wherein said charging server includes a calculating unit for calculating a network access charge by said charging server according to a charging method information selected by said customer, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network.

2. The Internet charging system as defined in claim 1, comprising:
  in the information terminal,
  an access program for accessing the Internet;
  a usage state monitor program for monitoring the state of Internet usage by the customer;
  an information terminal charging database having an information terminal charging table which includes information required for calculating the Internet usage fee; and
  an access setting database having an access table which includes information on plural providers such as phone numbers, ID numbers, passwords, thereby automatically changing a provider.

3. The Internet charging system as defined in claim 1, wherein
  the charging table has
  line usage fee information concerning a usage fee of the public network.

4. The Internet charging system as defined in claim 1, wherein
  the charging table has
  advertisement size information concerning a size of the advertisement displayed on the information terminal.

5. The Internet charging system as defined in claim 1, wherein
  the charging system has
  advertisement number information concerning the number of advertisements displayed on the information terminal.

6. The Internet charging system as defined in claim 1, wherein the charging table has advertisement display time information concerning a display time of the advertisement displayed on the information terminal.

7. The Internet charging system as defined in claim 1, wherein the charging table has usage time-zone information concerning a time zone in which the client uses the Internet.

8. The Internet charging system as defined in claim 1, wherein the charging table has information on accumulated access time that is an accumulation of time for which the customer uses the Internet.

9. The Internet charging system as defined in claim 1, wherein the charging table has data packet amount information concerning an amount of data packets utilized in the Internet.

10. The Internet charging system as defined in claim 1, wherein the charging table has communication traffic state information concerning a communication traffic state in the public network.

11. The Internet charging system as defined in claim 1, wherein the charging table has electric commerce deal amount/frequency information, which concerns a deal amount when the customer performs electronic commerce employing the Internet, and a frequency of performing the electronic commerce.

12. An Internet charging system in a system having an information terminal and a terminal server that provides Internet access service employing a public network to the information terminal, comprising on the terminal server side:

a charging server for sequentially calculating an Internet usage fee which occurs according to Internet usage by an Internet user through the information terminal;

a charging database having a charging table required for calculating the Internet usage fee;

a customer database having a customer table which includes information on a customer as the Internet user through the information terminal;

an advertisement data controller for controlling a size and a display time of an advertisement which is sent to the terminal server;

an advertisement content server for retaining contents of the advertisement;

a data traffic monitor server for monitoring data traffic of the Internet; and a usage state monitor server for monitoring a state of Internet usage by the customer;

wherein the charging table which includes information on a charging method associated with Internet access is periodically transmitted to the information terminal;

wherein an Internet access service providing method, an advertisement distribution method, and the charging method associated with Internet access are changed according to the state of Internet usage by the customer and the result of the selection by the customer of the desired charging method information in the charging table, said desired charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network; and wherein said charging server includes a calculating unit for calculating a network access charge by said charging server according to a charging method information selected by said customer, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network.

13. The Internet charging system as defined in claim 12, comprising in the information terminal:

an access program for accessing the Internet;

a usage state monitor program for monitoring the state of Internet usage by the customer;

an information terminal charging database having an information terminal charging table which includes information required for calculating the Internet usage fee; and an access setting database having an access table which includes information on plural providers, thereby automatically changing a provider.

14. The Internet charging system as defined in claim 12, wherein the charging table has line usage fee information concerning a usage fee of the public network.

15. The Internet charging system as defined in claim 12, wherein the charging table has advertisement display time information concerning a display time of the advertisement displayed on the information terminal.

16. The Internet charging system as defined in claim 12, wherein the charging table has usage time-zone information concerning a time zone in which the client uses the Internet.

17. The Internet charging system as defined in claim 12, wherein the charging table has information on accumulated access time that is an accumulation of time for which the customer uses the Internet.

18. The Internet charging system as defined in claim 12, wherein the charging table has data packet amount information concerning an amount of data packets utilized in the Internet.

19. An Internet charging system in a system having an information terminal and a terminal server that provides Internet access service employing a public network to the information terminal, comprising on the terminal server side:

a charging server for sequentially calculating an Internet usage fee which occurs according to Internet usage by an Internet user through the information terminal;

a charging database having a charging table required for calculating the Internet usage fee;

a customer database having a customer table which includes information on a customer as the Internet user through the information terminal;

an advertisement data controller for controlling a size and a display time of an advertisement which is sent to the terminal server;

an advertisement content server for retaining contents of the advertisement;

a data traffic monitor server for monitoring data traffic of the Internet; and a usage state monitor server for monitoring a state of Internet usage by the customer;

wherein the charging table which includes information on a charging method associated with Internet access is periodically transmitted to the information terminal;

wherein one or more of an Internet access service providing method, an advertisement distribution method, and the charging method associated with Internet access are changed according to the state of Internet usage by the customer and the result of the selection by the customer of the desired charging method information in the charging table; and wherein the information terminal is configured to automatically change a provider.

20. The Internet charging system as defined in claim 19, wherein the charging table has advertisement size information concerning a size of the advertisement displayed on the information terminal.

21. The Internet charging system as defined in claim 19, wherein the charging system has advertisement number information concerning the number of advertisements displayed on the information terminal.

22. The Internet charging system as defined in claim 19, wherein the charging table has communication traffic state information concerning a communication traffic state in the public network.

23. The Internet charging system as defined in claim 19, wherein the charging table has electronic commerce deal amount/frequency information which concerns a deal amount when the customer performs electronic commerce employing the Internet, and a frequency of performing the electronic commerce.

24. A method of providing a network access to a user of an information terminal in a system including a terminal server, a charging server, and a customer database, said method comprising the steps of:

responsive to receiving a network access request from said user by said terminal server, conditionally, upon successfully authenticating said user, granting said access request;

charging said user by said charging server based upon a charging information in said customer database;

presenting a user a selection for charging method information, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network;

calculating a network access charge by said charging server according to a charging method information selected by said user, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network;

responsive to accepting said user's selection, transmit said selection to at least one of: said customer database, said charging server.

25. A method of providing a network access to a user of an information terminal in a system including a terminal server, a charging server, a customer database, and an access setting database including information on plural providers, said method comprising the steps of:

responsive to receiving a network access request from said user by said terminal server, conditionally, upon successfully authenticating said user, granting said access request;

charging said user by said charging server based upon a charging information in said customer database;

presenting a user a selection for charging method information;

calculating a network access charge by said charging server according to a charging method information selected by said user, said charging method information including at least one information item selected from the group consisting of: a size of the advertisement displayed on the information terminal, a number of advertisements displayed on the information terminal, electronic commerce deal amount, electronic commerce deal frequency, and communication traffic state information concerning a communication traffic state in the public network;

responsive to accepting said user's selection, automatically select a provider from said access setting database.

* * * * *